United States Patent [19]

Leube

[11] Patent Number: 5,767,180

[45] Date of Patent: Jun. 16, 1998

[54] AQUEOUS POLYMER EMULSIONS

[75] Inventor: Hartmann F. Leube, Ludwigshafen, Germany

[73] Assignee: BASF Aktiengesellschaft, Ludwigshafen, Germany

[21] Appl. No.: 567,478

[22] Filed: Dec. 5, 1995

[30] Foreign Application Priority Data

Dec. 9, 1994 [DE] Germany ............ 44 43 887.7

[51] Int. Cl.$^6$ ............ C08J 3/00; C08K 5/52; C08K 3/02; C08L 33/00
[52] U.S. Cl. ............ 524/145; 524/700; 524/706; 524/707; 524/710; 524/849
[58] Field of Search ............ 524/145, 700, 524/706, 707, 710, 849

[56] References Cited

U.S. PATENT DOCUMENTS 5,234,711  8/1993  Kamen et al. ............ 427/213.34

FOREIGN PATENT DOCUMENTS

| | | |
|---|---|---|
| 0 339 713 | 11/1989 | European Pat. Off. |
| 2 325 662 | 4/1977 | France |
| 42 13 965 | 11/1993 | Germany |
| 43 32 005 | 3/1995 | Germany |

OTHER PUBLICATIONS

Vinyl Polymerization, vol. 1, Part II, p. 5, 1969, J.W. Vanderhoff, et al., "Kinetics and Mechanisms of Polymerization".

Langmuir, vol. 10, pp. 2498–2500, 1994, Marcus Antonietti, "Polymerization in Micromulsions of Natural Surfactants and Protein Fuctionalization of the Particles".

Ullmanns Encylopadie der Technischen Chemie, vol. 10, 4th Edition, Verlag Chemie, Weinheim, 1975, pp. 449–455, Dr. Rudolf Heusch, "Emulsionen".

M.K. Sharma, et al., "Introduction to Macro–and Micromulsions" in ACS Symposium Series 272, pp. 1–17, 1985, Macro– and Microemulsions Theory and Applications.

Ullmann's Encyclopedia of Industrial Chemistry, Fifth Edition, vol. A9, VCH (1987), p. 310.

Journal of Polymer Science: Polymer Letters Edition, vol. 22, pp. 31–38, 1984, "Polymerization of Oil–in–Water Micromulsions: Polymerization of Styrene and Methyl Methacrylate".

Makromol. Chem., vol. 193, pp. 2781–2792, 1992, Shinji Watanabe, et al., "Emulsion Polymerization of Styrene Using Phospholipids with Polymerizable Chain as an Emulsifier".

Makromol. Chem., vol. 190, pp. 1195–1205, 1989, Kazuo Yamaguchi, et al., "Emulsion Polymerization of Styrene Using Phospholipid as Emulsifier. Immobilization of Phospholipids on the Latex Surface".

*Primary Examiner*—Patrick D. Niland
*Attorney, Agent, or Firm*—Oblon, Spivak, McClelland, Maier & Neustadt, P.C.

[57] ABSTRACT

Aqueous polymer emulsions contain dispersants based on natural lecithins.

29 Claims, No Drawings

AQUEOUS POLYMER EMULSIONS

The present invention relates to aqueous polymer emulsions which contain at least one compound of the general formula I

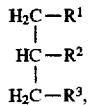

wherein $R^1$ is an acyloxy radical of a carboxylic acid selected from the group consisting of saturated aliphatic monocarboxylic acids of 8 to 26 carbon atoms, monounsaturated or polyunsaturated aliphatic monocarboxylic acids of 8 to 26 carbon atoms and monocarboxylic acids of 8 to 26 carbon atoms which are obtainable from the corresponding monounsaturated or polyunsaturated aliphatic monocarboxylic acids by partial or complete hydroxylation of the unsaturated functions, $R^2$ is O—H, O—$(CH_2$—$CH_2$—$)_m$H in which m is from 1 to 50, $OSO_3H$, $OPO_2H_2$, an acyloxy radical $R^1$

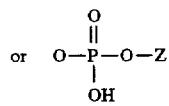

in which Z is

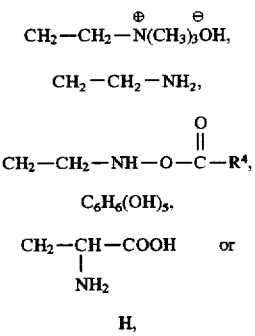

$R^3$ is O—H, O—$(CH_2$—$CH_2$—O—$)_m$H in which m is from 1 to 50 $OSO_3H$, $OPO_2H_2$, an acyloxy radical $R^1$

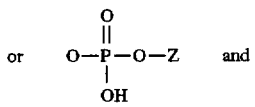

$R^4$ is $C_1$- to $C_5$-alkyl, with the proviso that exactly one of the two radicals $R^2$ and $R^3$ is

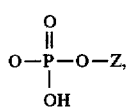

and/or a salt of a compound of the general formula I and whose content of dispersed polymer is ≧10% by volume, based on the aqueous polymer emulsion (in this publication, the stated percentages by volume are based on 25° C. and 1 atm).

Advantageously, the polymer content of the novel aqueous polymer emulsions is ≧20, usually from 20 to 75, preferably from 30 to 65, in general from 40 to 60, % by volume, on the same basis as above.

Compounds of the general formula I are known. They are essentially phosphatides which occur in nature in all animal and vegetable cells, especially in the brain, in the heart, in the liver, in egg yolk and in soybean. They are commercially available from, inter alia, Lucas Meyer GmbH & Co., Hamburg.

If Z is

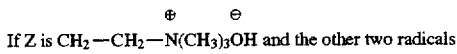

If Z is $CH_2$—$CH_2$—$N(CH_3)_3OH$ and the other two radicals $R^2$ and $R^3$ as well as $R^1$ are each a fatty acid acyloxy radical, the compounds I offer two in the narrower sense as lecithins. The cephalins differ from the lecithins in that Z is $CH_2$—$CH_2$—$NH_2$.

In other usage, compounds I in which one of the two radicals $R^2$ and $R^3$ as well as $R^1$ is a fatty acid acyloxy radical are frequently also referred to very generally as lecithins, regardless of the type of substituent Z.

Aqueous polymer emulsions are systems which contain finely divided polymer particles dispersed in an aqueous dispersing medium. The dispersed polymer may be, for example, a polycondensate, such as a polyester or polyether, a polyadduct, such as polyurethane, or a polymer obtained by free radical or ionic polymerization of monomers having at least one unsaturated carbon-carbon bond. A distinction is made between primary and secondary dispersions. In the former, the polymer is prepared directly in dispersion by the free radical aqueous emulsion polymerization method. In the case of secondary dispersions, on the other hand, the polymer is prepared outside the aqueous dispersing medium, for example in organic solution or in the absence of a solvent, and is not dispersed in the aqueous medium until after its preparation.

A common feature of all aqueous polymer emulsions is that the disperse distribution of the polymer as such generally has no stability. Rather, it is usually necessary to stabilize the disperse distribution by the concomitant use of dispersants, and this applies in particular in the case of aqueous polymer emulsions having a high polymer volume content.

An important property of aqueous polymer emulsions is their ability to form polymer films on evaporation of the aqueous dispersing medium, a property shared by polymer solutions on evaporation of the solvent.

On the basis of this property, they are widely used as binders, for example for paper coating slips, nonwovens, textile printing inks, coating materials, finishes and adhesives.

The disadvantage of films of aqueous polymer emulsions is that they usually contain the dispersants concomitantly used for stabilizing the aqueous polymer emulsion. When the films come into contact with water, a frequent result is the washing out of the dispersants which as a rule stabilize not only the polymer/water phase boundary but also the air/water phase boundary and therefore promote foam formation in aqueous systems.

There is therefore increasing interest in dispersants which, on the one hand, are capable of sufficiently stabilizing the disperse distribution of polymers in an aqueous medium but, on the other hand, promote foam formation only to a small extent. It is also advantageous if the dispersants used are biodegradable.

It is an object of the present invention to provide aqueous polymer emulsion which are stabilized with dispersants which meet the requirements described above.

We have found that this object is achieved by the aqueous polymer emulsions defined at the outset.

The following prior art is relevant.

Langmuir 10 (1994), 2498–2500, discloses that mixtures of lecithin and sodium cholate or sodium oleate are capable of promoting the formation (with the addition of free radical initiators) of aqueous microemulsions of, for example, styrene, which microemulsions can undergo free radical polymerization. The polymerization product obtained is a lecithin-containing aqueous polymer emulsion. DE-A 43 32 005 concerns corresponding systems.

The term emulsion includes disperse systems of two liquids which are insoluble or only slightly soluble in one another, in which the liquids are present in more or less fine distribution. The liquid present in excess is usually referred to as the continuous phase and the liquid dispersed in the continuous phase is usually referred to as the disperse phase.

The term aqueous emulsion is used as a rule when the aqueous phase forms the continuous phase. For the preparation of an emulsion, it is usually necessary to add emulsifiers (Ullmanns Encyklopädie der technischen Chemie, vol. 10, 4th edition, Verlag Chemie, Weinheim (1975), page 449).

According to M. K. Sharma and D. O. Shah in ACS Symposium Series 272, Macro- and Microemulsions, Theory and Applications, Ed. Dinesh O. Shah, American Chemical Society, Washington, D.C. (1985), pages 1 to 15, a person skilled in the art distinguishes emulsions as macroemulsions and microemulsions. The former are such that the disperse phase comprises mainly droplets having a diameter of >0.1 μm whereas in microemulsions the disperse phase comprises for the most part droplets having a diameter of <0.1 μm. According to the abovementioned authors, further distinctions between the two abovementioned types of emulsion are that macroemulsions have a milky white appearance and are thermodynamically unstable (ie. if a macroemulsion is left to itself it separates as a function of time into the two immiscible liquids, ie. it is not automatically formed on combining its components but only under the action of additional forces, for example with stirring), whereas microemulsions usually have a transparent appearance and are thermodynamically stable (ie. after the components of a microemulsion have been combined, the system is converted automatically (even without stirring) into the state of a microemulsion as a function of time and remains in said state).

According to Ullmann's Encyclopedia of Industrial Chemistry, Fifth Edition, Vol. A9, VCH (1987), page 310, column 2, paragraph 5.3.3., the formation of an aqueous microemulsion is usually associated with the presence of four components: the hydrophobic substance to be emulsified, the water, a surface-active emulsifier and a solubilizer (the formation of an aqueous macroemulsion, on the other hand, usually requires the presence of the hydrophobic substance to be emulsified, a surface-active emulsifier, the water and dispersing energy).

The role played by the lecithin in this connection in Langmuir 10 (1994), 2498–2500, is unclear. This prior art merely reveals that the presence of certain amounts of water, styrene, lecithin and sodium cholate or sodium oleate (in certain ratios) gives rise to an aqueous microemulsion of styrene in water, which is capable of free radical polymerization and leads to an aqueous polymer emulsion. However, it is not evident from this that lecithin is a suitable dispersant for stabilizing aqueous polymer emulsions. This is all the more true since aqueous polymer emulsions of industrial interest usually have a polymer volume content of at least 10% by volume, based on the aqueous polymer emulsion. However, the free radical polymerization of aqueous microemulsions of monomers capable of free radical polymerization usually leads to very dilute aqueous polymer emulsions. This is associated with, inter alia, the fact that the polymer particle diameter distribution of aqueous polymer emulsions prepared by free radical polymerization from aqueous microemulsions of monomers capable of free radical polymerization is very narrow (monodisperse) and limited to diameters of <120 nm (cf. Langmuir 10 (1994), 2498, column 1), which, in the case of a high polymer volume content, leads to systems which are no longer free-flowing (cf. for example DE-A 42 13 965 and literature cited therein). For corresponding reasons, the monomer volume content of the aqueous starting monomer microemulsion is limited.

Thus, the polymer volume content in Langmuir 10 (1994), 2498–2500, is in all cases ≦5% by volume, based on the resulting aqueous polymer emulsion.

A further difference between aqueous polymer emulsions obtainable by free radical aqueous macroemulsion polymerization (starting from an aqueous macroemulsion of the monomers to be polymerized) and aqueous polymer emulsions obtained by free radical aqueous microemulsion polymerization (starting from an aqueous microemulsion of the monomers to be polymerized) is usually in the content of emulsifier or dispersant, based on the dispersed polymer. In aqueous polymer emulsions obtained by free radical aqueous macroemulsion polymerization, dispersant content is as a rule ≦20, frequently ≦10, preferably ≦5, % by weight, based on the dispersed polymer, thus limiting the tendency of the aqueous polymer emulsion to form foam. In contrast, the total emulsifier content used in Langmuir 10 (1994), 2498–2500, is ≧30% by weight, based on the dispersed polymer, in all examples.

A further difference between free radical aqueous macroemulsion polymerization and free radical aqueous microemulsion polymerization is that, in the former, the dispersed monomer droplet acts essentially only as a monomer reservoir but the polymerization sites themselves are outside the monomer droplets and thus supplied with monomers by diffusion via the aqueous phase. The dispersants used play a substantial role in determining the formation of the polymerization sites (cf. for example J. W. Vanderhoff in "Vinyl Polymerization", Part II, "Kinetics and Mechanisms of Polymerization", Vol. 1, George E. Harn, Ed., Marcel Dekker, New York, 1969, page 5).

In contrast, it is assumed in free radical aqueous microemulsiom polymerization that the emulsified monomer droplets themselves form the polymerization site. This concept is supported in particular by the fact that the diameters of the resulting polymer particles essentially correspond to those of the monomer droplets in the aqueous starting emulsion (cf. for example Journal of Polymer Science: Polymer Letters Edition, 22 (1984), 31–38).

This means that conclusions about the suitability of an assistant for free radical aqueous macroemulsion polymerization cannot be drawn on the basis of suitability of the same assistant for free radical aqueous microemulsion polymerization. In this context, it may be noted that Antonietti in Langmuir 10 (1994), 2498–2500, in any case departs from the use of lecithin as a dispersant for aqueous polymer emulsions. Thus, in column 1 on page 2499, it is pointed out that the resulting aqueous polymer emulsions coagulate on acidification.

According to Watanabe et al. in Makromol. Chem 193 (1992), 2781–2792, naturally occurring lipids, which include the natural phosphatides of the general formula I, are generally unsuitable for dispersing polymer particles in an aqueous medium. Watanabe et al. attribute this to, inter alia, the hydrophobic interruption of the long alkyl chains which are contained in natural phosphatides and imply a certain tendency to association, as also known for associative thickeners (cf. for example EP-B 339 712).

Watanabe et al. therefore recommend modified forms of the compounds of the general formula I as dispersants to be used for free radical aqueous macroemulsion polymerizations. The modifications primarily comprise interrupting at least one alkyl chain by an aromatic ring which has a vinyl radical as substituent, via which the dispersants recommended by Watanabe et al. are copolymerized in the copolymer in the course of the free radical aqueous macroemulsion polymerization. It should be pointed out at this point that, even where $R^1$ in the compounds I is an acyloxy radical of an unsaturated carboxylic acid, an abovementioned copolymerization of this type is as a rule not effected since the corresponding carbon-carbon double bonds are not activated double bonds and therefore do not have a pronounced tendency to copolymerization. It should furthermore be noted that the polymer volume content in all examples from Watanabe et al. is less than 6% by volume, based on the aqueous polymer emulsion.

Correspondingly, Yamaguchi, Watanabe and Nakahama in Makromol. Chem. 190 (1989), 1195–1205, also recommend modified forms of compounds of the general formula I as dispersants for aqueous polymer emulsions which are obtainable by the free radical aqueous macroemulsion polymerization method and the essential modification of which correspondingly comprises shortening the alkyl chains and interrupting them with an aromatic ring. However, the modifications described have the disadvantage of lower biodegradability of the dispersants and an expensive synthesis. It is noteworthy that the examples in Makromol. Chem. 190 (1989), 1195–1205, are also limited to aqueous polymer emulsions whose polymer volume content is less than 6% by volume, based on the aqueous polymer emulsion, ie. to a range in which the stabilization problems of aqueous polymer emulsions are not particularly pronounced when the polymer particles are of the usual size.

We have found that this object is achieved and that, according to the invention, compounds of the general formula I are suitable dispersants for aqueous polymer emulsions up to the maximum polymer volume contents. What is striking here is not only their excellent stabilizing effect but in particular their small tendency to promote foam formation, their biodegradability and the fact that they are renewable raw materials.

Compounds I which are suitable according to the invention are, for example, those in which $R^1$ is derived from a fatty acid from Table 1 in Römpp Chemie Lexikon, Cm-G, Thieme Verlag, 1990, 9th edition, page 1344. Preferred compounds among these are those in which $R^1$ is derived from palmitic acid ($CH_3$—$(CH_2)_{14}$—COOH), stearic acid ($CH_3$—$(CH_2)_{16}$—COOH), oleic acid ($CH_3$—$(CH_2)_7$—CH=CH—$(CH_2)_7$—COOH), linoleic acid ($CH_3$—$(CH_2)_4$—CH=CH—$CH_2$—CH=CH—$(CH_2)_7$—COOH), linolenic acid ($CH_3$—$CH_2$—CH=CH—$CH_2$—CH=CH—$CH_2$—CH=CH—$(CH_2)_7$—COOH), palmitoleic acid or arachidonic acid.

Preferred compounds I are those in which $R^1$ is an acyloxy radical of 15 an aliphatic monocarboxylic acid having an even number of carbon atoms. Furthermore, the number of carbon atoms in $R^1$ is in general preferably 12 to 24, particularly preferably 14 to 22, very particularly preferably 16 to 18. It is also advantageous if $R^1$ is straight-chain. Particularly advantageous radicals $R^1$ are straight-chain and have an even number of carbon atoms. The abovementioned statements also apply to $R^2$ or $R^3$ if these are an acyloxy radical such as $R^1$.

Advantageous compounds I are in particular those in which $R^2$ or $R^3$ is hydroxyl, among which in turn those in which $R^2$ is hydroxyl are preferred.

Other advantageous compounds I are those in which $$Z \text{ is } CH_2-CH_2-\overset{\oplus}{N}(CH_3)_3\overset{\ominus}{OH}, CH_2-CH_2-NH_2 \text{ or } C_6H_6(OH)_5.$$

Particularly advantageous compounds I are those which simultaneously have the features stated above as being preferred.

Mixtures of compounds I, as contained in, or derived from, for example, egg lecithin, soybean lecithin or rape lecithin (in the broader sense) are also suitable. This applies in particular to enzymatically hydrolyzed lecithin from which a fatty acid chain has been eliminated by enzymatic treatment, ie. replaced by a hydroxyl group. However, it is also true for hydroxylated lecithin (saturation of fatty acid double bonds with hydroxyl groups) or acetylated lecithin (addition of carboxylic acid radicals at the free amino group of the Z radicals $CH_2$—$CH_2$—$NH_2$) and lecithin multiply modified in the abovementioned manner.

Suitable lecithins or modified lecithins of the general formula I are the Lipotins® from Lucas Meyer GmbH & Co., Hamburg. This applies in particular to Lipotin 100, Lipotin SB, Lipotin 100J, Lipotin H, Lipotin NE, Lipotin NA and Lipotin AN and also to Lipopur®.

Particularly suitable salts of the compounds of the general formula I are their alkali metal (eg. Na and K) and ammonium salts.

As stated at the outset, suitable disperse phases of the novel aqueous polymer emulsions are polycondensates, such as a polyester or a polyether, polyadduct compounds, such as polyurethanes, and polymers obtainable by free radical or ionic polymerization of monomers having at least one unsaturated carbon-carbon bond. The relative number average molecular weight of the dispersed polymers is advantageously from 10,000 to $3 \cdot 10^6$, frequently from 25,000 to $2 \cdot 10^6$ or from 50,000 to $1 \cdot 10^6$, in many cases from 150,000 to $1 \cdot 10^6$. If the polymers are crosslinked polymers, the number average molecular weight often cannot be determined.

The total content of dispersant in a novel aqueous polymer emulsion is advantageously $\leq 20$, often $\leq 10$, in general $\leq 5$, % by weight, based on the dispersed polymer. As a rule, however, it is $\geq 0.1$, generally $\geq 0.5$, % by weight, based on the dispersed polymer. According to the invention, this dispersant content may consist exclusively of compounds of the general formula I and/or salts thereof but may additionally comprise other conventional dispersants over and above the abovementioned compounds. It preferably comprises at least 10, frequently at least 20, % by weight, based on the total amount of dispersant, of a compound of the general formula I and/or of a salt thereof, but frequently not more than 80, in general from 20 to 60, % by weight. The amount may of course also be 100% by weight, based on the total amount of dispersant. The number average polymer particle diameter $\bar{d}_n$ of the novel aqueous polymer emulsions is often $\geq 100$ nm, usually >120 nm or >130 nm, in general >150 nm. However, it is usually true that $\bar{d}_n$ is $\leq 5000$ nm and frequently also $\leq 1000$ nm. Particularly typical are novel aqueous polymer emulsions having $\bar{d}_n \geq 200$ nm and $\bar{d}_n \leq 800$ nm.

Preferred novel aqueous polymer emulsions are those whose dispersed polymer is obtainable by free radical polymerization of monomers having at least one unsaturated carbon-carbon bond, in particular by free radical aqueous macroemulsion polymerization thereof (and, if required, subsequent polymer-analogous reaction). In the free radical aqueous macroemulsion polymerization, the free radical polymerization is carried out in a manner known per se to a person skilled in the art, starting from an aqueous macroemulsion of the monomers to be polymerized, with the addition of free radical polymerization initiators and dispersants.

Suitable monomers having at least one monoethylenically unsaturated group include in particular, inter alia, monomers which can be subjected to free radical polymerization in a simple manner, such as the olefins, eg. ethylene, vinylaromatic monomers, such as styrene, α-methylstyrene, o-chlorostyrene or vinyltoluenes, esters of vinyl alcohol and monocarboxylic acids of 1 to 18 carbon atoms, such as vinyl acetate, vinyl propionate, vinyl n-butyrate, vinyl laurate, vinyl pivalate and vinyl stearate, and commercially available monomers VEOVA® 9-11 (VEOVA X is a trade name of Shell and is applied to vinyl esters of carboxylic acids which are also referred to as Versatic® X acids), esters of α,β-monoethylenically unsaturated mono- and dicarboxylic acids of, preferably, 3 to 6 carbon atoms, in particular acrylic acid, methacrylic acid, maleic acid, fumaric acid and itaconic acid, with alkanols of in general 1 to 12, preferably 1 to 8, in particular 1 to 4, carbon atoms, in particular methyl, ethyl, n-butyl, isobutyl, tert-butyl and 2-ethylhexyl acrylate and methacrylate, dimethyl maleate or n-butyl maleate, nitriles of α,β-monoethylenically unsaturated carboxylic acids, such as acrylonitrile, and conjugated $C_4$–$C_8$-dienes, such as 1,3-butadiene and isoprene. In the case of aqueous polymer emulsions produced exclusively by the free radical aqueous macroemulsion polymerization method, the stated monomers are, as a rule, the main monomers, which together usually account for more than 50% by weight, based on the total amount of the monomers to be polymerized by the free radical aqueous macroemulsion polymerization method. As a rule, these monomers have only a moderate to low solubility in water under standard conditions of temperature and pressure (25° C., 1 atm). Monomers which have a higher water solubility under the abovementioned conditions are, for example, α,β-monoethylenically unsaturated mono- and dicarboxylic acids and the amides thereof, for example acrylic acid, methacrylic acid, maleic acid, fumaric acid, itaconic acid, acrylamide and methacrylamide, and vinylsulfonic acid and its water-soluble salts and N-vinylpyrrolidone.

In the case of aqueous polymer emulsions produced exclusively by the free radical aqueous macroemulsion polymerization method, the abovementioned monomers having a higher water solubility are usually polymerized merely as modifying monomers in amounts of less than 50, as a rule from 0.5 to 20, preferably from 1 to 10, % by weight, based on the total amount of the monomers to be polymerized.

Monomers which usually increase the internal strength of the films of aqueous polymer emulsions normally have at least one epoxy, hydroxyl, N-methylol or carbonyl group or at least two nonconjugated ethylenically unsaturated double bonds. Examples of these are N-alkylolamides of α,β-monoethylenically unsaturated carboxylic acids of 3 to 10 carbon atoms and esters thereof with alkenols of 1 to 4 carbon atoms, among which N-methylolacrylamide and N-methylol methacrylamide are very particularly preferred, monomers having two vinyl radicals, monomers having two vinylidene radicals and monomers having two alkenyl radicals. Particularly advantageous here are the diesters of dihydric alcohols with α,β-monoethylenically unsaturated monocarboxylic acids, among which acrylic and methacrylic acid are preferred. Examples of such monomers having two nonconjugated ethylenically unsaturated double bonds are alkylene glycol diacrylates and dimethacrylates, such as ethylene glycol diacrylate, 1,3-butylene glycol diacrylate, 1,4-butylene glycol diacrylates and propylene glycol diacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate or triallyl cyanurate. Also of particular importance in this context are the hydroxy-$C_1$–$C_8$-alkyl methacrylates and acrylates, such as hydroxy-n-ethyl, hydroxy-n-propyl or hydroxy-n-butyl acrylate and methacrylate, and compounds such as diacetoneacrylamide and acetylacetoxyethyl acrylate or methacrylate, ureidoethyl methacrylate and acrylamido glycolic acid. In the case of aqueous polymer emulsions produced exclusively by the free radical aqueous macroemulsion polymerization method, the abovementioned monomers are generally polymerized in amounts of from 0.5 to 10% by weight, based on the total amount of the monomers to be polymerized.

The dispersed polymers of novel aqueous polymer emulsions in polymerized form preferably comprise from 70 to 100% by weight of esters of acrylic or methacrylic acid with alkanols of 1 to 12 carbon atoms or styrene (group I)

or from 70 to 100% by weight of styrene and/or butadiene (group II)

or from 70 to 100% by weight of vinyl chloride and/or vinylidene chloride (group III)

or from 40 to 100% by weight of vinyl acetate, vinyl propionate and/or ethylene (group IV).

Particularly relevant within group I are monomer compositions which contain:

from 0.1 to 5% by weight of at least one α,β-monoethylenically unsaturated carboxylic acid of 3 to 6 carbon atoms and/or the amide thereof and from 70 to 99.9% by weight of esters of acrylic and/or methacrylic acid with alkanols of 1 to 12 carbon atoms and/or styrene.

In general, it is advantageous if the monomer compositions within group I are selected exclusively from the following monomers of the group consisting of ethyl acrylate, n-butyl acrylate, 2-ethylhexyl acrylate, methyl methacrylate, tert-butyl methacrylate, styrene, acrylic acid, methacrylic acid, acrylamide, methacrylamide and acrylonitrile.

Particularly relevant monomer compositions within group II contain:

0.1 to 5% by weight of at least one α,β-monoethylenically unsaturated carboxylic acid of 3 to 6 carbon atoms and/or the amide thereof and from 70 to 99.9% by weight of styrene and/or butadiene.

Particularly relevant monomer compositions within group IV contain:

from 0.1 to 5% by weight of at least one α,β-monoethylenically carboxylic acid of 3 to 6 carbon atoms and/or the amide thereof and from 40 to 99.9% by weight of vinyl acetate, vinyl propionate and/or ethylene.

Frequently, the monomer composition within the abovementioned range of compositions is chosen so that the Tg values (DSC, midpoint temperature) of the resulting dispersed polymers is below 50° C. or below 30° C., often below 20° C. and in many cases also below 0° C. (down to −70° C.).

In contrast to the free radical aqueous microemulsion polymerization, which is carried out in such a way that the total amount of the aqueous microemulsion is initially taken in the polymerization vessel (owing to the low monomer volume concentration, the removal of the heat of reaction presents no problems), the free radical aqueous macroemulsion polymerization is advantageously carried out by the feed method, ie. the predominant amount of the monomers constituting the dispersed polymer, as a rule from 50 to 100, preferably from 70 to 100, particularly preferably from 80 to 100, very particularly advantageously from 90 to 100, % by weight of their total amount, are not added to the polymerization vessel until the beginning of the free radical aqueous macroemulsion polymerization and are then introduced at the rate of polymerization of the monomers already present in the polymerization vessel. As a rule, the addition was effected by continuous feed (in general as pure monomer feed or preemulsified in the aqueous phase as a macroemulsion) are usually at a rate such that at least 80, preferably at least 90, very particularly preferably at least 95, % by weight of the monomers already present in the polymerization vessel have been incorporated by polymerization. Aqueous seed polymer emulsions may be concomitantly used in order to influence the particle size of the dispersed polymer particles (cf. EP-B 40 419 and Encyclopedia of Polymer Science and Technology, Vol. 5, John Wiley & Sons Inc., New York (1966), page 847).

Suitable free radical polymerization initiators for the free radical aqueous macroemulsion polymerization described above are all those which are capable of initiating free radical aqueous emulsion polymerization. These may be both peroxides and azo compounds. However, redox initiator systems are of course also suitable. The use of peroxodisulfuric acid and/or its alkali metal salts and/or its ammonium salt as free radical initiators is preferred. The amount of free radical initiator systems used is preferably from 0.1 to 2% by weight, based on the total amount of the monomers to be polymerized. The manner in which the free radical initiator system is added to the polymerization vessel in the course of the free radical aqueous macroemulsion polymerization described tends to be of minor importance. The initiator system may either be initially taken in its entirety in the polymerization vessel or added continuously or stepwise at the rate at which it is consumed in the course of free radical aqueous macroemulsion polymerization. Specifically, this depends, in a manner known per se to a person skilled in the art, both on the chemical nature of the initiator system and on the polymerization temperature.

A direct consequence of the abovementioned fact is that a suitable reaction temperature for the free radical aqueous macroemulsion polymerization is the entire range from 0° to 100° C., but preferably at temperatures of from 70° to 100° C., preferably from 80° to 100° C. and particularly preferably from >85° to 100° C.

The use of superatmospheric or reduced pressure is possible, so that the polymerization temeprature may also exceed 100° C. and may be up to 130° C. or more. Readily volatile monomers, such as ethylene, butadiene or vinyl chloride, are preferably polymerized under superatmospheric pressure. It is of course possible concomitantly to use molecular weight regulators, such as tert-dodecyl mercaptan, in the free radical aqueous macroemulsion polymerization.

As stated above, other dispersants usually used in particular in free radical aqueous macroemulsion polymerizations may be concomitantly used (as auxiliary dispersants), in addition to the compounds of the general formula I and their salts, for stabilizing novel aqueous polymer emulsions. Suitable dispersants of this type are both protective colloids and emulsifiers.

Suitable protective colloids are, for example, polyvinyl alcohols, cellulose derivatives or vinylpyrrolidone-containing copolymers. A detailed description of further suitable protective colloids is to be found in Houben-Weyl, Methoden der organischen Chemie, volume XIV/1, Makromolekulare Stoffe, Georg-Thieme-Verlag, Stuttgart, 1961, pages 411 to 420. Mixtures of emulsifiers and/or protective colloids may of course also be used. Only emulsifiers whose relative molecular weights, in contrast to the protective colloids, are usually less than 1000 are preferably used as dispersants. They may be anionic, cationic or nonionic. If mixtures of surfactants are used, the individual components must of course be compatible with one another, which in case of doubt can be checked in a few preliminary experiments. In general, anionic emulsifiers are compatible with one another and with nonionic emulsifiers. The same also applies to cationic emulsifiers, whereas anionic and cationic emulsifiers are generally incompatible with one another. Conventional emulsifiers are, for example, ethoxylated mono-, di- and trialkylphenols (degree of ethoxylation: from 3 to 100, alkyl radical: $C_4$ to $C_{12}$), ethoxylated fatty alcohols (degree of ethoxylation: from 3 to 100, alkyl radical: $C_8$ to $C_{18}$), and alkali metal and ammonium salts of alkylsulfates (alkyl radical: $C_8$ to $C_{16}$), of sulfuric half-esters of ethoxylated alkanols (degree of ethoxylation: from 1 to 70, alkyl radical: $C_{12}$ to $C_{18}$) and of ethoxylated alkylphenols (degree of ethoxylation: from 3 to 100, alkyl radical: $C_4$ to $C_{12}$), of alkanesulfonic acids (alkyl radical: $C_{12}$ to $C_{18}$) and of alkylarylsulfonic acids (alkyl radical: $C_9$ to $C_{18}$). Further suitable emulsifiers, such as sulfosuccinic esters, are described in Houben-Weyl, Methoden der organischen Chemie, volume XIV/1, Makromolekulare Stoffe, Georg-Thieme-Verlag, Stuttgart, 1961, pages 192 to 208.

Compounds of the general formula II

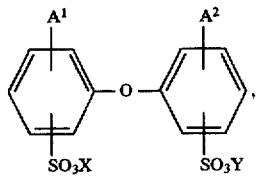

where $A^1$ and $A^2$ are each hydrogen or $C_4$- to $C_{24}$-alkyl and are not simultaneously hydrogen, and X and Y may be alkali metal ions and/or ammonium ions, have also proven suitable surfactants. In the formula I, $A^1$ and $A^2$ are each preferably linear or branched alkyl of 6 to 18, in particular 6, 12 or 16, carbon atoms or hydrogen, and $A^1$ and $A^2$ are not both simultaneously hydrogen. X and Y are preferably sodium, potassium or ammonium ions, sodium being particularly preferred. Particularly advantageous compounds II are those in which X and Y are each sodium, $A^1$ is branched alkyl of 12 carbon atoms and $A^2$ is hydrogen or $A^1$. Industrial mixtures which contain from 50 to 90% by weight of the monoalkylated products, for example Dowfax® 2A1 (trade mark of Dow Chemical Company), are frequently used. The compounds II are generally known, for example from U.S. Pat. No. 4,269,749, and are commercially available.

The amount of auxiliary dispersant used is advantageously from 0.5 to 6, preferably from 1 to 3, % by weight, based on dispersed polymer.

The novel compounds I and/or the salts thereof are preferably combined with anionic and/or nonionic auxiliary dispersants. It is noteworthy that, in this context, the novel compounds I were found to have an inhibitory effect on the foam-promoting action of the auxiliary dispersants.

In principle, the compounds of the general formula I and/or the salts thereof (as well as the auxiliary dispersants) may be added before, during or after the preparation of the emulsion of the polymers in the aqueous dispersing medium (before, during and/or after the free radical aqueous macro-emulsion polymerization) (they are usually also used for stabilizing the aqueous monomer macroemulsion). Owing to their hydrophobic, oily appearance, they are advantageously not added as such. Rather, it is advantageous for the desired success if they are used in a form micronized in an aqueous medium by the action of high shearing forces (finely divided droplet-like distribution in water). Advantageously, such aqueous emulsions (micronized products) contain from 15 to 25% by weight, based on the aqueous emulsion, of novel compounds I. In another possible method which is recommended, the compounds of the general formula I are dissolved in the monomers and used in this form for the preparation of novel aqueous polymer emulsions. If the monomers are added as an aqueous macroemulsion in the feed process, said emulsion advantageously also contains the compounds of the general formula I and any auxiliary dispersants concomitantly used. The novel aqueous polymer emulsions are distinguished by completely satisfactory stability of the emulsion (in particular with respect to the action of polyvalent ions or high shearing forces) and a reduced tendency to foam formation. The fact that the emulsion-stabilizing action of the compounds of the general formula I exists essentially over the entire pH range of the aqueous dispersing medium (pH 1 to pH 12) is particularly advantageous. The stabilizing action at a pH of from 2 to 5, preferably from 2 to 4, is especially advantageous since such acidic aqueous polymer emulsions are essentially resistant to attack by microorganisms even without the addition of microbicides. If the compounds of the general formula I are radicals of unsaturated fatty acids, these may undergo autoxidation in the films of the novel aqueous polymer emulsions under the action of atmospheric oxygen, which prevents them from being washed out under the action of water.

The novel aqueous polymer emulsions are used as binders, for example for nonwovens, textile printing, finishes and coatings and/or as adhesives, in particular as contact adhesives.

EXAMPLES

I) Preparation of novel aqueous polymer emulsions D1 to D9 and of a comparative emulsion VD1 (all polymerizations were carried out under an $N_2$ atmosphere).

| D1: | 50 g of Lipotin NE (enzymatically hydrolyzed lecithin) were micronized at 25° C. by means of a dispersing stirrer (Ultra-Turrax, IKA, Staufen) in 200 g of water (9000 revolutions per minute (9000 rpm), 5 min). An aqueous emulsion (micronized product) of the Lipotin NE was obtained. The mean particle size was 217 nm (unless stated otherewise, in all examples mean particle diameters mean the average value determined by photon correlation spectroscopy by means of an Autosizer 2c from Malvern Instruments, UK). |
|---|---|

| A mixture of | |
|---|---|
| 17.7 g | of a 35% strength by weight aqueous polystyrene seed emulsion (number average polystyrene particle size: 38 nm; stabilized by means of 10% by weight, based on dispersed polystyrene, of the sodium salt of dodecylbenzenesulfonic acid), |
| 2% by weight | of feed 1, |
| 20% by weight | of feed 2 and |
| 250 g | of water | was initially taken in a polymerization vessel. The mixture was heated to 85° C. in the course of 15 minutes while stirring and then kept at this temperature for a further 10 minutes while stirring. Thereafter, while maintaining the temperature at 85° C., the remaining amount of feed 1 was metered continuously in the course of 3 hours, and the remaining amount of feed 2 in the course of 3.5 hours (beginning at the same time), into the polymerization vessel while stirring. The polymerization mixture was then stirred for a further 2.5 hours at 85° C. An aqueous polymer emulsion D1 having a polymer volume content of 45.9% by volume was obtained. The mean polymer particle diameter was 183 nm.

| Feed 1: | Aqueous emulsion of |
|---|---|
| | 300 g of styrene, |
| | 282 g of n-butyl acrylate, |
| | 18 g of acrylamide, |
| | 30 g of the aqueous Lipotin NE micronized product and |
| | 228 g of water. |
| Feed 2: | 2.4 g of sodium peroxodisulfate and |
| | 100 g of water. |
| D2: A mixutre of | |
| 4.0 g | of Dowfax 2A1 (45% strength by weight), |
| 2% by weight | of feed 1, |
| 20% by weight | of feed 2 and |
| 250 g | of water | was initially taken in a polymerization vessel. The mixture was heated to 85° C. in the course of 15 minutes while stirring and was then kept at this temperature for a further 10 minutes while stirring. Thereafter, while maintaining the temperature of 85° C. and while stirring, the remaining amount of feed 1 was metered in continuously in the course of 3 hours and (beginning at the same time) the remaining amount of feed 2 in the course of 3.5 hours. The polymerization mixture was then stirred for a further 2.5 hours at 85° C. An aqueous polymer emulsion D2 having a polymer volume content of 46.6% by volume was obtained. The mean polymer particle diameter was 189 nm.

| Feed 1: | Aqueous macroemulsion comprising |
|---|---|
| | 300 g of styrene, |
| | 282 g of n-butyl acrylate, |
| | 18 g of acrylamide, |
| | 30 g of the aqueous Lipotin NE micronized product from D1 and |
| | 228 g of water. |
| Feed 2: | 2.4 g of sodium peroxodisulfate and |
| | 100 g of water. |
| D3: A mixture of | |
| 14.8 g | of 35% strength by weight aqueous polystyrene seed emulsion (number average polystyrene particle size: 38 nm; stabilized |

|  | by means of 10% by weight, based on the dispersed polystyrene, of the sodium salt of dodecylbenzenesulfonic acid), |
|---|---|
| 15% by weight | of feed 1, |
| 10% by weight | of feed 2 and |
| 300 g | of water | was initially taken in a polymerization vessel. The mixture was heated to 85° C. in the course of 15 minutes while stirring and was then kept at this temperature for a further 10 minutes while stirring. Thereafter, while maintaining the temperature of 85° C. and while stirring, the remaining amount of feed 1 was metered in continuously in the course of 2 hours and (beginning at the same time) the remaining amount of feed 2 in the course of 2.5 hours. The polymerization mixture was then stirred for a further 2.5 hours at 85° C. An aqueous polymer emulsion D3 having a polymer volume content of 28.4% by volume was obtained. The mean polymer particle diameter was 175 nm.

| Feed 1: | Aqueous macroemulsion comprising 485 g of n-butyl acrylate, 15 g of acrylamide, 25 g of the aqueous Lipotin NE micronized product from D1 and 670 g of water. |
|---|---|
| Feed 2: | 2 g of sodium peroxodisulfate and 200 g of water. |
| D4: A mixture of | |
| 14.8 g | of 35% strength by weight aqueous polystyrene seed emulsion (number average polystyrene particle size: 38 nm; stabilized by means of 10% by weight, based on the dispersed polystyrene, of the sodium salt of dodecylbenzenesulfonic acid), |
| 15% by weight | of feed 1, |
| 10% by weight | of feed 2 and |
| 300 g | of water | was initially taken in a polymerization vessel. The mixture was heated to 85° C. in the course of 15 minutes while stirring and was then kept at this temperature for a further 20 minutes while stirring. Thereafter, while maintaining the temperature of 85° C. and while stirring, the remaining amount of feed 1 was metered in continuously in the course of 2 hours and (beginning at the same time) the remaining amount of feed 2 in the course of 2.5 hours. The polymerization mixture was then stirred for a further 2.5 hours at 85° C. An aqueous polymer emulsion D4 having a polymer volume content of 27.4% by volume was obtained. The mean polymer particle diameter was 169 nm.

| Feed 1: | Aqueous macroemulsion comprising 5 g of Lipotin NE, dissolved in 200 g of styrene, 285 g n-butyl acrylate, 15 g of acrylamide and 690 g of water. |
|---|---|
| Feed 2: | 2 g of sodium peroxodisulfate and 200 g of water. |
| D5: A mixture of | |
| 17.7 g | of 35% strength by weight aqueous polystyrene seed emulsion (number average polystyrene particle size: 38 nm; stabilized by means of 10% by weight, based on the dispersed polystyrene, of the sodium salt of dodecylbenzenesulfonic acid), |
| 2% by weight | of feed 1, |
| 20% by weight | of feed 2 and |
| 250 g | of water | was initially taken in a polymerization vessel. The mixture was heated to 85° C. in the course of 15 minutes while stirring and was then kept at this temperature for a further 10 minutes while stirring. Thereafter, while maintaining the temperature of 85° C. and while stirring, the remaining amount of feed 1 was metered in continuously in the course of 3 hours and (beginning at the same time) the remaining amount of feed 2 in the course of 3.5 hours. The polymerization mixture was then stirred for a further 2.5 hours at 85° C. The reaction mixture was then cooled to 25° C. and feed 3 was added continuously in the course of 5 minutes while stirring. An aqueous polymer emulsion having a polymer volume content of 46.4% by volume was obtained. The mean polymer particle diameter was 190 nm.

| Feed 1: | Aqueous macroemulsion comprising 300 g of styrene, 282 g n-butyl acrylate, 18 g of acrylamide, 6.7 g of Dowfax 2A1, 45% strength by weight, and 228 g of water. |
|---|---|
| Feed 2: | 2.4 g of sodium peroxodisulfate and 100 g of water. |
| Feed 3: | 30 g of the aqueous Lipotin NE micronized product from D1. |
| D6: A mixture of | |
| 15% by weight | of feed 1, |
| 10% by weight | of feed 2 and |
| 250 g | of water | was initially taken in a polymerization vessel. The mixture was heated to 85° C. in the course of 15 minutes while stirring and was then kept at this temperature for a further 20 minutes while stirring. Thereafter, while maintaining the temperature of 85° C. and while stirring, the remaining amount of feed 1 was metered in continuously in the course of 3 hours and (beginning at the same time) the remaining amount of feed 2 in the course of 3.5 hours. The polymerization mixture was then stirred for a further 2.5 hours at 85° C. An aqueous polymer emulsion D6 having a polymer volume content of 27.0% by volume was obtained. The mean polymer particle diameter was 345 nm.

| Feed 1: | Aqueous macroemulsion comprising 5 g of Lipotin 100J (soybean lecithin), dissolved in 250 g of styrene, 235 g n-butyl acrylate, 18 g of methacrylamide, 520 g of water. |
|---|---|
| Feed 2: | 2.0 g of sodium peroxodisulfate and 200 g of water. |
| D7: A mixture of | |
| 19 g | of the aqueous Lipotin NE micronized product from D1, |
| 15% by weight | of feed 1, |
| 10% by weight | of feed 2 and |
| 300 g | of water | was initially taken in a polymerization vessel. The mixture was heated to 85° C. in the course of 15 minutes while stirring and was then kept at this temperature for a further 20 minutes while stirring. Thereafter, while maintaining the temperature of 85° C. and while stirring, the remaining amount of feed 1 was metered in continuously in the course of 2 hours and (beginning at the same time) the remaining amount of feed 2 in the course of 2.5 hours. The polymerization mixture was then stirred for a further 2.5 hours at 85° C. An aqueous polymer emulsion D7 having a polymer volume content of 26.8% by volume was obtained. The mean polymer particle diameter was 377 nm.

| Feed 1: | Aqueous macroemulsion comprising |
| --- | --- |
| | 250 g of styrene, |
| | 235 g of n-butyl acrylate, |
| | 19 g of the aqueous Lipotin NE micronized product from D1 and |
| | 500 g of water. |
| Feed 2: | 2 g of sodium peroxodisulfate and |
| | 200 g of water. |
| D8: | 50 g of Lipotin NA (acetylated lecithin) were micronized in 200 g of water at 25° C. by means of a dispersing stirrer (Ultra-Turrax, IKA, Staufen) (9000 rpm, 5 min). An aqueous emulsion (micronized product) of Lipotin NA was obtained. The mean particle size was 210 nm. |
| A mixture of | |
| 14.5 g | of a 35% strength by weight aqueous polystyrene seed emulsion (number average polystyrene particle size: 38 nm; stabilized by means of 10% by weight, based on dispersed polystyrene, of the sodium salt of dodecylbenzenesulfonic acid), |
| 2% by weight | of feed 1, |
| 20% by weight | of feed 2 and |
| 400 g | of water | was initially taken in a polymerization vessel. The mixture was heated to 85° C. in the course of 15 minutes while stirring and then kept at this temperature for a further 10 minutes while stirring. Thereafter, while maintaining the temperature at 85° C., the remaining amount of feed 1 was metered continuously in the course of 3 hours, and the remaining amount of feed 2 in the course of 3.5 hours (beginning at the same time), into the polymerization vessel while stirring. The polymerization mixture was then stirred for a further 2.5 hours at 85° C. An aqueous polymer emulsion D8 having a polymer volume content of 27.5% by volume was obtained. The mean polymer particle diameter was 167 nm.

| Feed 1: | Aqueous macroemulsion comprising |
| --- | --- |
| | 250 g of styrene, |
| | 235 g of n-butyl acrylate, |
| | 15 g of acrylamide, |
| | 25 g of the aqueous Lipotin NA micronized product and |
| | 550 g of water. |
| Feed 2: | 2 g of sodium peroxodisulfate and |
| | 200 g of water. |
| D9: A mixture of | |
| 17.6 g | of a 5% strength by weight aqueous solution of potassium oleate, |
| 2% by weight | of feed 1, |
| 20% by weight | of feed 2 and |
| 250 g | of water | was initially taken in a polymerization vessel. The mixture was heated to 85° C. in the course of 15 minutes while stirring and then kept at this temperature for a further 10 minutes while stirring. Thereafter, while maintaining the temperature at 85° C., the remaining amount of feed 1 was metered continuously in the course of 3 hours, and the remaining amount of feed 2 in the course of 3.5 hours (beginning at the same time), into the polymerization vessel while stirring. The polymerization mixture was then stirred for a further 2.5 hours at 85° C. The reaction mixture was then cooled to 25° C. and feed 3 was then metered in continuously while stirring. An aqueous polymer emulsion D9 having a polymer volume content of 40.9% by volume was obtained. The mean polymer particle diameter was 131 nm.

| Feed 1: | Aqueous macroemulsion comprising |
| --- | --- |
| | 300 g of styrene, |
| | 282 g of n-butyl acrylate, |
| | 18 g of acrylamide, |
| | 94.4 g of a 5% strength by weight aqueous solution of potassium oleate and |
| | 320 g of water. |
| Feed 2: | 2.4 g of sodium peroxodisulfate and |
| | 100 g of water. |
| Feed 3: | 30 g of the aqueous Lipotin NE micronized product from D1. |

VD1: As for D9, but feed 3 was omitted.

II) Investigation of the aqueous polymer emulsions D1 to D9 and VD1 for stability and tendency to foam (all polymer emulsions were brought to a solids volume concentration of 25% by volume; the investigations were all carried out at 25° C).

a) Foam test 100 ml of particular aqueous polymer emulsion were introduced into 250 ml glass cylinder. The latter was closed with a stopper and vigorously shaken 20 times by hand. The measuring cylinder was then set down and the volume of the resulting foam was determined immediately after the end of the shaking and after standing for 3, 60 and 120 minutes after the end of shaking. The results are shown in the table.

b) Ion stability

In order to evaluate the stability of the aqueous polymer emulsions with respect to the action of polyvalent ions, 3 drops of the aqueous polymer emulsion to be tested were added to 10 ml of aqueous calcium chloride solution of different concentrations. The concentration of $CaCl_2$ (in % by weight, based on $CaCl_2$ solution) at which the aqueous polymer emulsion was just still stable (still showed no signs of flocculation, agglomeration, etc.) was determined. When this concentration was exceeded, flocculation and/or agglomeration occurred. The results are likewise shown in the table.

c) Stability on stirring

The stability to the action of mechanical shearing forces was determined by adding 2 drops of an antifoam (Agitan® 281, antifoam from Münzing GmbH, Heilbronn) to 200 ml of the aqueous polymer emulsion to be tested and stirring the mixture for 15 minutes at 5000 rpm with an IKA stirrer (IKA RE 166) to which was attached a disperser disc (diameter 40 mm). In order to evaluate the result, the mean polymer particle diameter before ($d_z$, before) and after ($d_z$, after) the action of stirring was determined. A mean polymer particle size which increases under the action of stirring indicates decreasing stability of the aqueous polymer emulsion (agglomeration). The results are likewise shown in the table. The table additionally shows the pH of the aqueous dispersing medium of the various aqueous polymer emulsions.

TABLE

|  | D1 | D2 | D3 | D4 | D5 | D6 | D7 | D8 | D9 | VD1 |
|---|---|---|---|---|---|---|---|---|---|---|
| Foam (immediately, ml) | 70 | 80 | 60 | 65 | 50 | 40 | 60 | 85 | 10 | 130 |
| Foam (3 min, ml) | 20 | 40 | 25 | 20 | 20 | 10 | 25 | 35 | 0 | 55 |
| Foam (60 min, ml) | 0 | 10 | 0 | 5 | 0 | 0 | 5 | 0 | 0 | 25 |
| Foam (120 min, ml) | 0 | 0 | 0 | 0 | 0 | 0 | 0 | 0 | 0 | 0 |
| Ion stability (% by weight of $CaCl_2$) | 20 | 25 | 25 | 20 | 20 | 20 | 25 | 25 | 10 | 1 |
| pH | 2.1 | 2.4 | 2.5 | 3.5 | 2.1 | 2.6 | 2.9 | 2.1 | 7.1 | 7.4 |
| $d_z$, before | 183 | 189 | 175 | 169 | 190 | 345 | 377 | 167 | 131 | 128 |
| $d_z$, after | 175 | 187 | 177 | 170 | 188 | 343 | 383 | 182 | 142 | 182 |

I claim:

1. An aqueous polymer emulsion which contains at least one compound of the formula I $$\begin{array}{c} H_2C-R^1 \\ | \\ HC-R^2 \\ | \\ H_2C-R^3, \end{array} \qquad I$$

wherein $R^1$ is an acyloxy radical of a carboxylic acid selected from the group consisting of saturated aliphatic monocarboxylic acids of 8 to 26 carbon atoms, monounsaturated or polyunsaturated aliphatic monocarboxylic acids of 8 to 26 carbon atoms and monocarboxylic acids of 8 to 26 carbon atoms which are obtained from the corresponding monounsaturated or polyunsaturated aliphatic monocarboxylic acids by partial or complete hydroxylation of the unsaturated functions, $R^2$ is O—H, O—$(CH_2-CH_2-O)_m$—H in which m is from 1 to 50, $OSO_3H$, $OPO_2H_2$, an acyloxy radical $R^1$ or $$\begin{array}{c} O \\ \| \\ O-P-O-Z \\ | \\ OH \end{array}$$

in which Z is $$CH_2-CH_2-\overset{\oplus}{N}(CH_3)_3\overset{\ominus}{O}H,$$

$$CH_2-CH_2-NH_2,$$

$$\begin{array}{c} O \\ \| \\ CH_2-CH_2-NH-O-C-R^4, \end{array}$$

$C_6H_6(OH)_5$, $$\begin{array}{c} CH_2-CH-COOH \\ | \\ NH_2 \end{array} \quad \text{or}$$

H, $R^3$ is O—H, O—$(CH_2-CH_2-O)_m$—H in which m is from 1 to 50, $OSO_3H$, $OPO_2H_2$, an acyl radical $R^1$ or $$\begin{array}{c} O \\ \| \\ O-P-O-Z \\ | \\ OH \end{array} \quad \text{and}$$

$R^4$ is $C_1$- to $C_5$-alkyl, with the proviso that exactly one of the two radicals $R^2$ and $R^3$ is $$\begin{array}{c} O \\ \| \\ O-P-O-Z, \\ | \\ OH \end{array}$$

or a salt of a compound of the general formula I and whose content of dispersed polymer is ≧20% by volume, based on the aqueous polymer emulsion.

2. An aqueous polymer emulsion as claimed in claim 1, whose content of dispersed polymer is from 20 to 75% by volume, based on the aqueous polymer emulsion.

3. An aqueous polymer emulsion as claimed in claim 1, whose content of dispersed polymer is from 30 to 65% by volume, based on the aqueous polymer emulsion.

4. An aqueous polymer emulsion as claimed in claim 1, whose content of dispersed polymer is from 40 to 60% by volume, based on the aqueous polymer emulsion.

5. An aqueous polymer emulsion as claimed in claim 1, which contains, as compound I, one in which $R^1$ has from 12 to 24 carbon atoms.

6. An aqueous polymer emulsion as claimed in claim 1, which contains, as compound I, one in which $R^1$ has from 14 to 22 carbon atoms.

7. An aqueous polymer emulsion as claimed in claim 1, which contains, as compound I, one in which $R^1$ has an even number of carbon atoms.

8. An aqueous polymer emulsion as claimed in claim 1, which contains, as compound I, one whose acyloxy radical $R^1$ is a carboxylic acid selected from the group consisting of palmitic acid, stearic acid, oleic acid, linoleic acid, linolenic acid, palmitoleic acid and arachidonic acid.

9. An aqueous polymer emulsion as claimed in claim 1, which contains, as compound I, one in which $R^2$ or $R^3$ is hydroxyl.

10. An aqueous polymer emulsion as claimed in claim 1, which contains, as compound I, one in which $R^2$ is hydroxyl.

11. An aqueous polymer emulsion as claimed in claim 1, which contains, as compound I, one in which z is $$CH_2-CH_2-\overset{\oplus}{N}(CH_3)_3\overset{\ominus}{O}H, CH_2-CH_2-NH_2 \text{ or } C_6H_6(OH)_5.$$

12. An aqueous polymer emulsion as claimed in claim 1, whose dispersed polymer has a relative number average molecular weight of from 50,000 to $3 \cdot 10^6$.

13. An aqueous polymer emulsion as claimed in claim 1, whose dispersed polymer has a relative number average molecular weight of from 150,000 to $1 \cdot 10^6$.

14. An aqueous polymer emulsion as claimed in claim 1, whose total content of dispersant is from ≧0.1 to ≦20% by weight, based on disperse polymer.

15. An aqueous polymer emulsion as claimed in claim 1, whose total content of dispersant is from ≧0.1 to ≦10% by weight, based on disperse polymer.

16. An aqueous polymer emulsion as claimed in claim 1, whose total content of dispersant is from $\geq 0.1$ to $\leq 5\%$ by weight, based on disperse polymer.

17. An aqueous polymer emulsion as claimed in claim 1, which contains at least 10% by weight, based on the total amount of dispersant present, of a compound of the formula I or of a salt thereof.

18. An aqueous polymer emulsion as claimed in claim 1, which contains at least 20% by weight, based on the total amount of dispersant present, of a compound of the formula I or of a salt thereof.

19. An aqueous polymer emulsion as claimed in claim 1, whose number average polymer particle diameter is $\geq 120$ nm.

20. An aqueous polymer emulsion as claimed in claim 1, whose number average polymer particle diameter is $\geq 150$ nm.

21. An aqueous polymer emulsion as claimed in claim 1, whose number average polymer particle diameter is $\geq 200$ nm and $\leq 800$ nm.

22. An aqueous polymer emulsion as claimed in claim 1, whose disperse polymer is obtained by free radical polymerization of monomers having at least one unsaturated carbon-carbon bond.

23. An aqueous polymer emulsion as claimed in claim 1, whose disperse polymer is obtained by free radical aqueous macroemulsion polymerization of monomers having at least one unsaturated carbon-carbon bond.

24. An aqueous polymer emulsion as claimed in claim 1, whose disperse polymer in polymerized form comprises from 70 to 100% by weight of esters of acrylic or methacrylic acid with an alkanol of 1 to 12 carbon atoms or styrene or from 70 to 100% by weight of styrene or butadiene or from 70 to 100% by weight of vinyl chloride or vinylidene chloride or from 40 to 100% by weight of vinyl acetate, vinyl propionate or ethylene.

25. An aqueous polymer emulsion as claimed in claim 1, whose aqueous dispersing medium has a pH of from 2 to 5.

26. A process for the preparation of an aqueous polymer emulsion as claimed in claim 1, wherein monomers having at least one monoethylenically unsaturated group are polymerized by the free radical aqueous macroemulsion polymerization method with the addition of at least one compound of the formula I or of a salt thereof.

27. A process as claimed in claim 26, which is carried out by the feed method.

28. A process as claimed in claim 27, wherein one or more compounds of the formula I are used in a form micronized in an aqueous medium or in a form in solution in the monomers to be polymerized.

29. An aqueous polymer emulsion, obtained by a process as claimed in claim 26.

* * * * *